US005268025A

United States Patent [19]

[11] Patent Number: 5,268,025

[45] Date of Patent: Dec. 7, 1993

Bondurant

[54] NON-ALCOHOL FOUNTAIN SOLUTION

[76] Inventor: Louis E. Bondurant, P.O. Box 2074, Middleburg, Va. 22117

[21] Appl. No.: 846,567

[22] Filed: Mar. 5, 1992

[51] Int. Cl.[5] .......... C09K 3/18

[52] U.S. Cl. .......... 106/2; 101/451

[58] Field of Search .......... 106/2; 101/451

[56] References Cited

U.S. PATENT DOCUMENTS 3,398,002 8/1968 Bondurant et al. .......... 106/2

4,374,036 2/1983 Canale et al. .......... 106/2

4,769,722 9/1988 Bondurant et al. .......... 106/2

*Primary Examiner*—Mark L. Bell

*Assistant Examiner*—Helene Klemanski

*Attorney, Agent, or Firm*—Raymond N. Baker

[57] ABSTRACT

A universal aqueous fountain solution, for use in planographic printing, which comprises in prescribed proportions a humectant, a buffer ethylene glycol N-butyl ether, a glycol ether and an amine replacement for the alcohol previously used in fountain solutions.

7 Claims, No Drawings

NON-ALCOHOL FOUNTAIN SOLUTION

BACKGROUND OF THE INVENTION

Planographic printing involves the preparation of a flexible printing plate having water-receptive nonprint areas and water-repellent ink-receptive areas constituting an image to be reproduced. The plate is moistened with an aqueous liquid, referred to in the trade as a fountain solution, which is repelled by the image, to render and maintain the nonprint areas of the plate ink repellent after which printing ink is applied to deposit the same on the ink-receptive image areas. The ink is then transferred from the image, usually by an offset blanket to a copy sheet, to form a reproduction of the image thereon. The moistening, inking and transfer operations are successively repeated for the production of large numbers of copies. After use, the fountain solution must be discarded in an environmental manner. The alcohol component creates a particular environmental problem.

FIELD OF THE INVENTION

The present invention relates particularly to improvements in fountain solutions which are to be used in the fountain of planographic printing which can be discarded in a safe manner.

There are three basic types of planographic printing plates, each of which has, heretofore, required that a different type of solution be used in the fountain of the press. The first of these types of printing plates is the so-called "photo-direct" plate which requires processing with an etchant prior to printing. The second type of plate is the so-called "metal plate", and the third type is the "direct-image" type, sometimes referred to as a "stencil" plate since it is prepared by typing or drawing directly on the plate. The stencil plate is usually made with a paper of plastic base.

A characteristic of these plates is that the image is oleophilic in nature in that it attracts oily or greasy substances and is essentially water repellent. The image background portion of the plate is hydrophilic to the extent that it can be readily wetted by water but, before being wetted, will accept and hold an oily or greasy image. A hydrophilic-oleophilic balance must be maintained so that the greasy image can be applied to the surface of the plate and the background area can be wetted. A planographic surface thus prepared and imaged is subject to treatment by an etching solution (etchant) which conditions the plate for printing. The etchant is repelled by the image portion of the plate but is attracted by the background area. The background area, therefore, is covered by a surface film of etchant leaving only the image portion ink receptive. Once in the press, the nonimage portion of the plate is maintained in a moistened condition by the fountain solution applied by water rollers.

Prior art fountain solutions are comprised generally of water, diluted aqueous solutions of gum arabic, or relatively complex formulations of alcohol, and/or other organic solvents. Also it has been proposed, heretofore, to add glycerine and/or other deliquescents and/or humectants to the fountain solution. Herein N-Methylpyrrolidine and its equivalent amines have been found to perform the solvent objectives of alcohol without a diminishment in printing quality and yet work well within the reagent formulations commonly used.

The present invention provides a fountain solution which is compatible with virtually all types of planographic printing plates and, does not require that the solution in the press fountain be changed each time that it is desired to use a different type of plate. While maintaining this advantage, there is provided a solution that is environmental friendly because it has eliminated the alcohol component.

SUMMARY OF THE INVENTION

It is an object of the present invention to provide a novel and improved non-alcohol solution for use in the fountain of planographic printing presses.

A further objective of the invention is to provide a non-hazardous fountain solution without any sacrifice in performance.

A still further objective of the invention is to provide a fountain solution with improved buffering action and having the ability to resist contamination caused by alkaline paper; stray specks of ink, ambient dust and the like, without the use of an alcohol component.

Another objective of the invention is to provide a novel and improved universal fountain solution, of the type used for maintaining planographic plates in a moist condition during printing through the use of amines rather than alcohol.

Yet another objective of the invention is to provide a novel and improved universal fountain solution which is compatible with various types of planographic printing plates, including direct-image plates, photo-direct plates, metal plates, fiber plates, and "Ektalith" plates, and which requires no special handling, special inks, special press adjustments, or other modifications of the printing process.

Still another object of the invention is to provide a novel and improved formulation for a fountain solution to be used in the fountain of planographic printing presses which formulation contains N-Methylpyrrolidine.

These and other objects of the invention will become more apparent to those versed in the art upon consideration of the following description.

DESCRIPTION OF THE INVENTION

The formulation of the invention is based upon an aqueous solution of a monobasic phosphate selected from the group consisting of monopotassium phosphate, monosodium phosphate and monoammonium phosphate acting as a buffer; a humectant selected from the group consisting of glycerin, propylene glycol and ethylene glycol; sorbitol, a substance selected from the group consisting of "butyl Cellosolve", "butyl Carbitol"; and "Jeffersol EB", all trade names for ethylene glycol monobutyl ether; and an amine selected from the amine group including N-Methylpyrrolidine, triethylamine and trimethylamine. A trace amount of phosphoric acid is added to adjust the pH to within approximately 2 to 7.0 with the preferred range being 3.5 to 4.5.

A preferred formula for the stock solution which may be diluted 1:7 with water for use with any of the various type of planographic printing plates referred to hereinabove, is given in the following example in which all parts are in terms of percent by weight:

EXAMPLE I

| | |
|---|---|
| Monopotassium phosphate | 2.00% |

-continued

| | |
|---|---|
| N-Methylpyrrolidine | 7.00% |
| Glycerin | 12.00% |
| Ethylene Glycol N-butyl Ether | 8% |
| Phosphoric Acid, 85% | 0.20% |
| Alkali Fast Green 2G | 0.05% |
| Tartrazine Yellow | 0.01% |
| Balance deionized water. | |

In preparing the solution set forth in the foregoing Example I, it is preferred that the monopotassium phosphate be added to the deionized water first and thoroughly mixed therein, after which the remaining liquid ingredients are added and thoroughly mixed therewith. The solution of Example I constitutes a stock solution which is further diluted in the ratio of one part of said solution to seven parts deionized water prior to use in the fountain of the press.

As examples of the ranges of operable concentrations of the solution components, there follows a number of examples, the first of which, Example II, shows low concentrations of the reagents. As in the foregoing example, all percentages are by weight.

EXAMPLE II

| | |
|---|---|
| Monopotassium phosphate | 0.1% |
| N-Methylpyrrolidine | 1.00% |
| Glycerin | 2.00% |
| Ethylene Glycol N-butyl ether | 1.00% |
| Phosphoric Acid, 85% | 0.20% |
| Alkali Fast Green 2G | 0.05% |
| Tartrazine Yellow | 0.01% |
| Balance deionized water. | |

In the following examples, larger quantities of reagents have been used. In example III, the large amount of N-Methylpyrrolidine has been employed, while in Example IV the large amount of glycerin has been used. Example IV the maximum amount of glycerin has been used. Example V is illustrative of the maximum amount of ethylene glycol monobutyl either. Example VI shows the use of the maximum amount of the buffer.

EXAMPLE III

| | |
|---|---|
| Monopotassium phosphate | 1.00% |
| N-Methylpyrrolidine | 25.00% |
| Glycerin | 5.00% |
| Ethylene Glycol N-butyl Ether | 3.00% |
| Phosphoric Acid, 85% | 0.20% |
| Alkali Fast Green 2G | 0.05% |
| Tartrazine Yellow | 0.01% |
| Balance deionized water. | |

EXAMPLE IV

| | |
|---|---|
| Monopotassium phosphate | 1.00% |
| N-Methylpyrrolidine | 2.00% |
| Glycerin | 30.00% |
| Ethylene Glycol N-butyl Ether | 1.00% |
| Phosphoric Acid, 85% | 0.20% |
| Alkali Fast Green 2G | 0.05% |
| Tartrazine Yellow | 0.01% |
| Balance deionized water. | |

EXAMPLE V

| | |
|---|---|
| Monopotassium phosphate | 1.00% |
| N-Methylpyrrolidine | 2.00% |
| Glycerin | 2.000% |
| Ethylene Glycol N-butyl Ether | 25.00% |
| Phosphoric Acid, 85% | 0.20% |
| Alkali Fast Green 2G | 0.05% |
| Tartrazine Yellow | 0.01% |
| Balance deionized water. | |

EXAMPLE VI

| | |
|---|---|
| Monopotassium phosphate | 10.00% |
| N-Methylpyrrolidine | 7.00% |
| Glycerin | 2.00% |
| Ethylene Glycol N-butyl Ether | 5.00% |
| Phosphoric Acid, 85% | 0.20% |
| Alkali Fast Green 2G | 0.05% |
| Tartrazine Yellow | 0.01% |
| Balance deionized water. | |

The amount of monopotassium phosphate used will be dependent upon the amount of non-aqueous materials in the solution. If the amount of nonaqueous materials is increased, the amount of monopotassium phosphate that will stay in the solution will be decreased.

EXAMPLE VII

| | |
|---|---|
| Monosodium phosphate | 2.00% |
| N-Methylpyrrolidine | 7.00% |
| Glycerin | 12.00% |
| Ethylene Glycol N-butyl Ether | 8.00% |
| Phosphoric Acid, 85% | 0.20% |
| Alkali Fast Green 2G | 0.05% |
| Tartrazine Yellow | 0.01% |

Balance deionized water plus a trace of phosphoric acid.

EXAMPLE VIII

| | |
|---|---|
| Monoammonium phosphate | 2.00% |
| N-Methylpyrrolidine | 7.00% |
| Glycerin | 12.00% |
| Ethylene Glycol N-butyl Ether | 8.00% |
| Phosphoric Acid, 85% | 0.20% |
| Alkali Fast Green 2G | 0.05% |
| Tartrazine Yellow | 0.01% |
| Balance deionized water plus trace of phosphoric acid | |

Examples VII and VIII are illustrative of the substitution of monosodium phosphate and monoammonium phosphate for monopotassium phosphate as the buffer. These examples also include the use of a trace of phosphoric acid to maintain optimum pH.

Alkali Fast Green 2 G at approximately 0.05% by weight and Tartrazine Yellow at approximately 0.01% by weight have been added to the illustrated solutions. These substances provide a light green color to the solution signifying a product that decreases safety hazards and is environmentally friendly.

Variations may also be made in the range of dilution of the stock solution with water. It has been found that acceptable ranges of dilution are from one part stock solution to one part water, to one part stock solution to thirty parts water. While all of the above formulations specify the use of deionized water, which is preferred, it should be understood that the use of deionized water is not a critical limitation of the invention.

It will thus be seen from the foregoing description that the present invention comprises a non-alcohol product which continues the condition of any one of a variety of planographic plates beyond the camera control to, and through, the printing cycle. It will also be seen that a fountain solution prepared according to the present invention accomplishes the intended objects and has the desirable advantages and characteristics, including those hereinbefore pointed out and others which are inherent in the invention.

Since certain changes may be made in the above formulations and processes, without departing from the scope of the invention herein involved, it is intended that all matter contained in the above description shall be interpreted as illustrative and not in a limiting sense.

I claim:

1. A non-alcohol universal fountain stock solution which is to be diluted with water comprising:

a buffer selected from the group consisting of monopotassium phosphate, monoammonium phosphate and monosodium phosphate, and an amine selected from the group consisting of trimethylamine, triethylamine and N-methylpyrrolidine, and a humectant selected from the group consisting of ethylene glycol, glycerin and propylene glycol, and ethylene glycol N-butyl ether.

2. The universal fountain stock solution of claim 1 wherein the amount of amine is in the range of 1% to 25% by weight.

3. The universal fountain stock solution of claim 1 wherein the amine is N-methylpyrrolidine and is present in the range of 1% to 25% by weight.

4. The universal fountain stock solution of claim 1 having a pH of about 3.5 to 4.5 wherein the buffer includes a phosphate in the range of 0.1% to 10% by weight and trace amounts of phosphoric acid.

5. The universal fountain stock solution of claim 1 wherein the humectant is present in the range of 2% to 30% by weight.

6. A universal fountain solution for use in planographic printing comprising: a buffer, a humectant, ethylene glycol N-butyl ether and, as a substitute for alcohol, an amine selected from the group consisting of triethylamine, trimethylamine and N-methylpyrrolidine.

7. The universal fountain solution of claim 6 in which the buffer includes an acid in an amount sufficient to provide a pH within the range of approximately 2 to 7.0.

* * * * *